United States Patent [19]

Poorten

[11] Patent Number: 4,737,096
[45] Date of Patent: Apr. 12, 1988

[54] INJECTION MOULD WITH INSERT PIECE AND INJECTION MOULDING UNIT FOR SAME

[75] Inventor: Antonius V. Poorten, Deurne, Netherlands

[73] Assignee: Kanaaldijk Z.W., Netherlands

[21] Appl. No.: 804,883

[22] Filed: Dec. 5, 1985

[30] Foreign Application Priority Data

Jul. 1, 1985 [NL] Netherlands .................. 8501893

[51] Int. Cl.[4] ............................................. B29C 45/14
[52] U.S. Cl. .................................... 425/190; 249/134;
264/107; 264/511; 425/504; 425/556; 425/577;
425/584; 425/810; 425/DIG. 60
[58] Field of Search ............... 425/502, 553, 554, 556,
425/810, 577, 190, 183, 184, 202, 44, 110, 116,
117, 121, 504, 584, 503, DIG. 60; 264/106, 155,
511, 1.3, 107; 249/134

[56] References Cited

U.S. PATENT DOCUMENTS

| | | | |
|---|---|---|---|
| 4,213,927 | 7/1980 | Alberti | 264/107 |
| 4,466,934 | 8/1984 | Cane et al. | 425/810 |
| 4,472,124 | 9/1984 | Kashihara et al. | 425/110 |
| 4,629,487 | 12/1986 | Monji et al. | 249/134 |

*Primary Examiner*—Jay H. Woo
*Assistant Examiner*—Timothy W. Heitbrink
*Attorney, Agent, or Firm*—John P. Snyder

[57] ABSTRACT

The molding apparatus for molding compact discs defines an openable mold cavity and the information bearing disc which forms the impression on the compact disc in held in place by vacuum in the mold cavity in order to allow ready and easy removal and replacement of the insert when necessary.

16 Claims, 8 Drawing Sheets

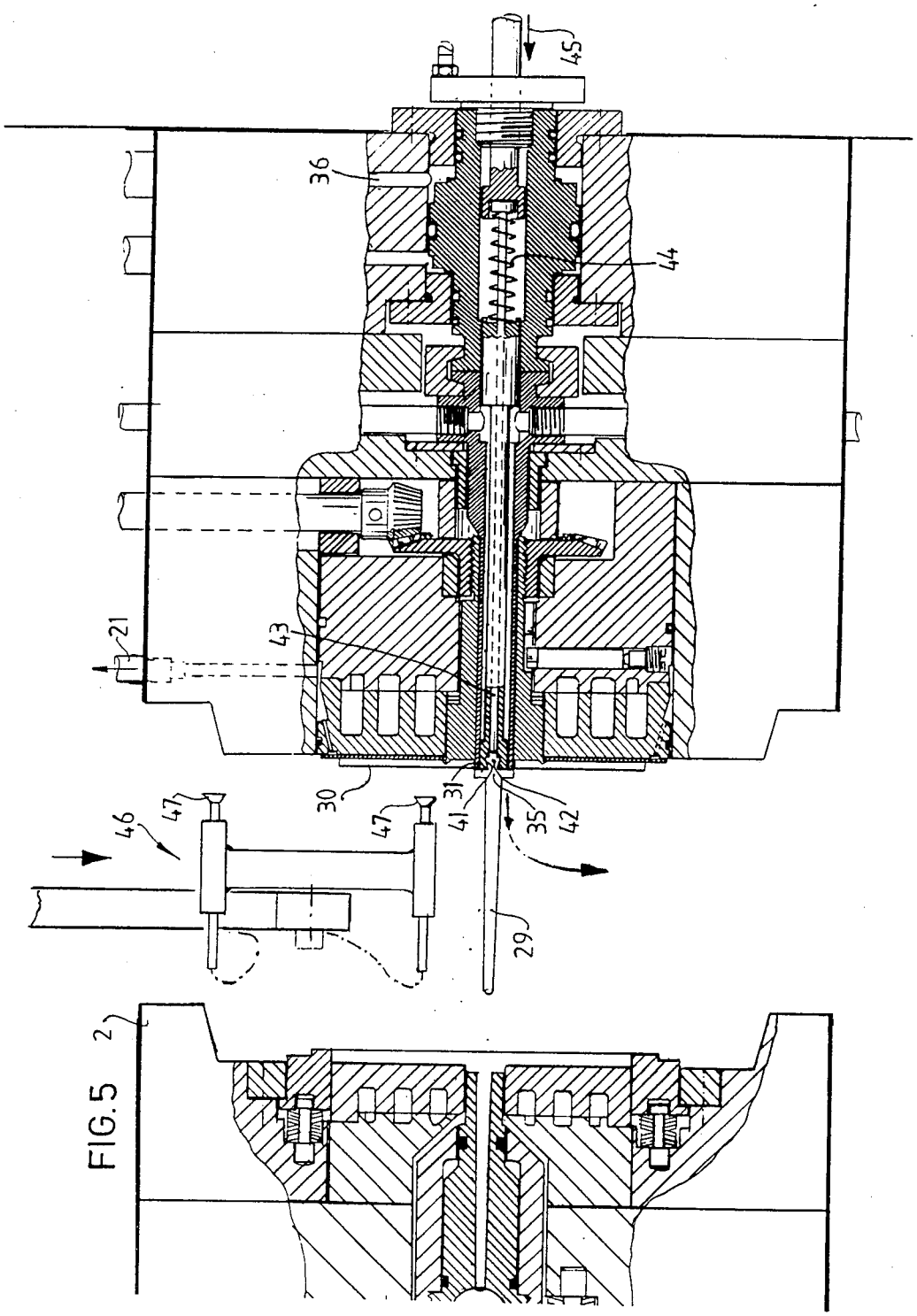

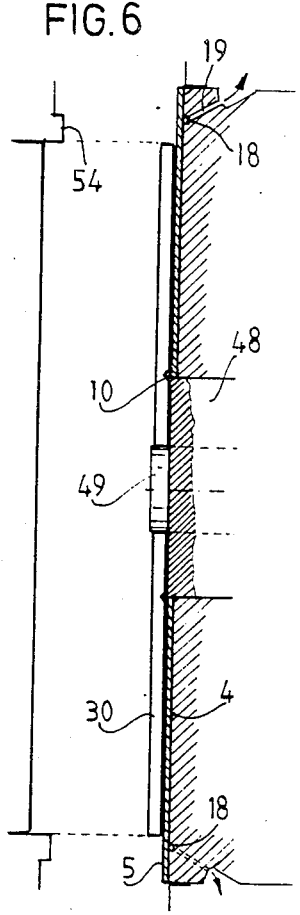
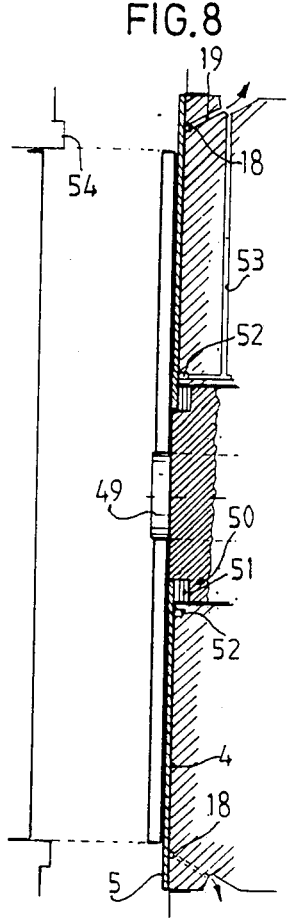
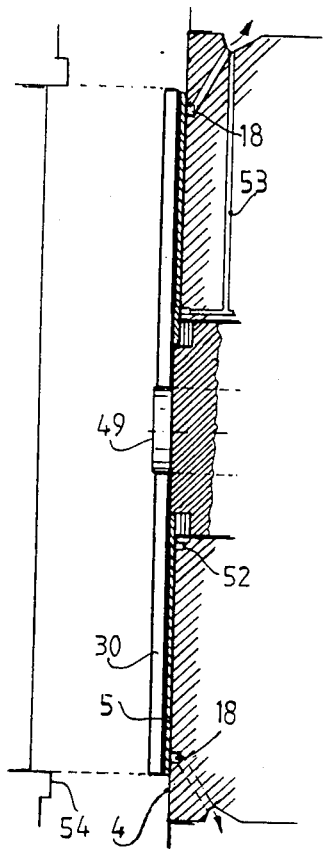
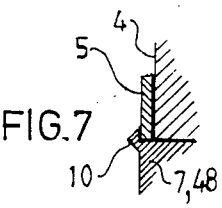
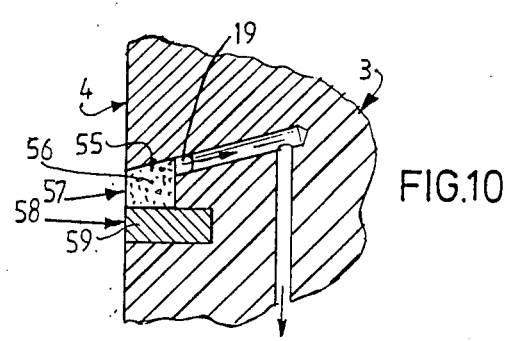

INJECTION MOULD WITH INSERT PIECE AND INJECTION MOULDING UNIT FOR SAME

The invention relates to an injection mould comprising at least two mould parts which are mutually movable between a closed position, in which they bound a form cavity, said cavity connecting to a pressure conduit for placing heated plastic under pressure in said cavity, and an opened position in which a shaped product can be removed, against at least one of the walls of which form cavity an insert piece is arranged, held in a pre-selected position by securing means.

Such an injection mould is known. A mould for manufacturing compact discs for example comes to mind. Such compact discs are round discs with a central hole on which audio information is recorded in digital form. The audio information is found in the form of a spiral shaped track of depressions on one of the flat sides of the disc, and is arranged thereon in the form of a negative impression of a corresponding complementarily formed disc-shaped insert piece against the corresponding wall of the mould form cavity.

High requirements must be met in the manufacture of compact discs; namely, the products must satisfy stringent norms with respect to accuracy of dimensioning.

The complementary information carrying disc made in the form of an insert piece must, as will be apparent be positioned with very great accuracy and lie flat against the wall concerned. During the opened phase of the mould, for example that in which a shaped compact disc can be removed, the nickel insert disc also has to remain correctly positioned.

A known method for an accurate and permanently correct positioning during the entire standing time of the insert piece, for example for the manufacture of 1,000 product units, is on the one hand to make use of a means of gripping round the rim of a central hole in the disc and on the other hand to grip the disc on its circumference. It must, however, be ensured that the insert piece is replaced without too great a loss of time, on the one hand with respect to the relatively short standing time and on the other hand because it has to be possible to switch easily from one type of disc to another, in other words to change production series.

Plastic moulds are generally expensive. The use of an insert piece with special securing means for placing and holding said insert piece in a pre-determined position is considerably more expensive still. Moreover, the requirement for an easy replaceability of the insert piece contributes to a further increase in the price of the mould.

The invention has for its object to provide an injection mould in a form such that it can be manufactured considerably more simply and therefore more cheaply, while still maintaining the accuracy of dimension and stability of the shaped objects.

To realize this object, the invention proposes an injection mould of the type referred to in the preamble which displays the feature that the securing means are connectable to a source for fluid underpressure (i.e., negative pressure, pressure less than atmospheric or vacuum) for holding, at least partially as a result of said underpressure, the or each insert piece against the wall concerned.

For manufacturing plastic objects in sheet form, which are for example disc shaped or for example the compact discs described above, such a mould can display the feature that the insert piece is a sheet arranged against a flat wall and that said wall displays at least one recess connectable to the underpressure source. Said recess can be made in the form of, for example, a ring-shaped groove.

Preferably in this case the or each recess can extend in a circumferential zone of the wall, by which is also understood the zone around a central hole that may be present.

In a practical embodiment, the mould can be made in a form such that the sheet displays a central hole and that mechanical means are also available for placing an holding said sheet in the pre-selected position by gripping on the rim of said hole.

In order to achieve an easy release of the sprue when the mould is opened, the variant in which the pressure conduit emerges in the form cavity via a diverging portion is to be recommended.

In the case of specific objects, it can be desirable or even essential to provide the shaped objects with a central hole. A post-treatment for this purpose is known. According to the invention, however, use is made preferably of punching means for punching a central hole out of a shaped object. In this way the residual tension in the shaped object can be considerably smaller than in the case of a post-treatment. Use can be made particularly of a variant which displays the characteristic that the punching means comprise a cylindrical part which forms part of the one mould portion, said cylindrical part having a front circumferential edge with a form adapted to the shape of the hole to be punched out of an object, said part being axially movable away from and towards the other mould portion, and that adjusting means are available to adjust the distance between the front circumferential edge of said cylindrical part and the forming surface of the other mould portion situated opposite it. In this case, the adjusting means can be regulated empirically so as to ensure the best possible quality of the shaped object when different plastics are used, while in this way it is also possible to achieve that use can be made of cold injection and hot injection.

Particularly with an eye to the possibility of determining the optimal stroke of the punching means, there is a workable variant in which the adjusting means are operable from the outside. Use can also be made here of operating means which are operative during the injection process, i.e. which move gradually, during the injection moulding, for example from a position of maximum mutual distance to a position of a pre-selected minimal distance, for example the distance O, or use can also be made of an embodiment in which a reciprocating movement takes place during the injection moulding.

Preference is given to an embodiment which displays the characteristic that the wall of the form cavity opposite the mouth of the pressure conduit exhibits a central recess converging towards said form cavity, the bottom of which recess is formed by the end surface of an ejector which serves to eject the part detached from the shaped product in the punching out of the central hole.

The invention further has for its object an injection moulding unit for an injection mould of the type heretofore described. Such a unit is characterised by control means for actuating the underpressure source in at least the opened position of the mould.

The invention will now be explained on the basis of the annexed drawing of several arbitrarily chosen embodiments, to which the invention is not, however, restricted. In the drawing:

FIG. 1-5 show a longitudinal section through an injection mould according to the invention in diverse phases of a production cycle;

FIG. 6 shows a detail explaining the securing of the insert disc with mechanical and underpressure means;

FIG. 7 shows the detail VII from FIG. 6; and

FIG. 8 shows a view corresponding to FIG. 6 of a variant in which the insert disc is held in position solely by underpressure;

FIG. 9 shows a variant of the embodiment as according to FIG. 8;

FIG. 10 shows a detail of an injection mould of which the recess, which is connected to suction means, is filled with a porous material; and the FIGS. 11 and 12 show two partially broken away sidelong views of injection moulds according to the invention which comprise punching means adjustable from the outside.

Figure 1:
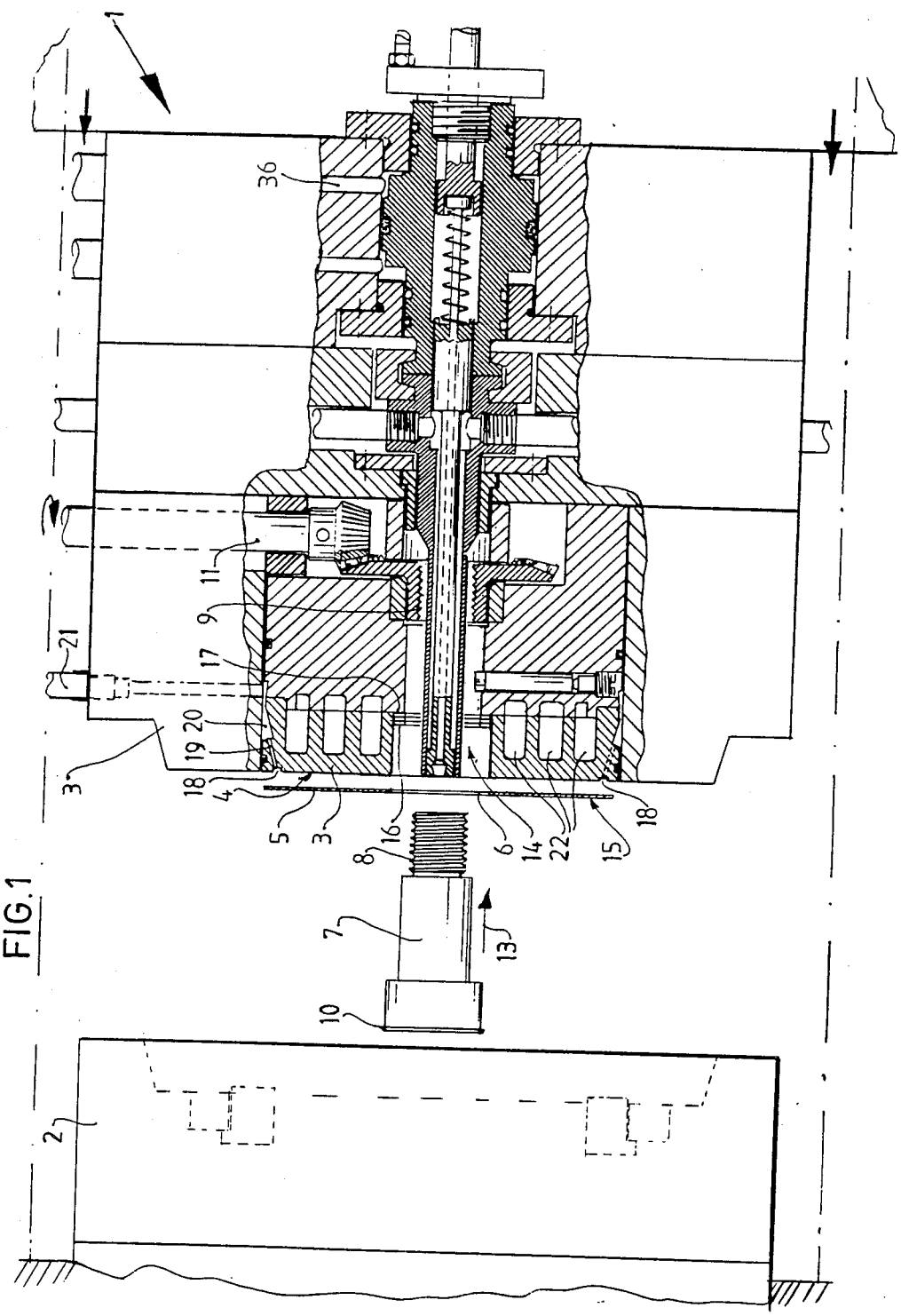

FIG. 1 shows an injection mould 1 according to the invention. This comprises a front mould 2 and a rear mould 3. Against the front surface 4 a nickel disc 5 can be placed which is provided with a central hole 6, and the disc 5 can be fixed against said front surface 4 by means of a disc holder 7. For this purpose, said disc holder 7 is firmly connectable with the rear mould 3 through screw thread 8 which co-operates with a threaded bush 9. A flange 10, the form of which is more clearly seen in FIG. 7, grips onto the rim of the central hole 6. By rotating the threaded bush 9 through operation of a rotatable operating element 11 which cooperates with said bush 9 via a gear coupling set at a right angle to it, the disc holder 7 can be moved in the direction of the arrow 13 into a correspondingly formed cavity 14 of the rear mould 3, securing the nickel disc 5 against the front surface 4.

The mould 1 is used to manufacture compact discs. The nickel disc 5, which carries the digital information for manufacturing the compact discs on the surface directed to the left in the drawing, is manufactured in a thickness of 0.300 mm. with a tolerance of 0.025 mm. more or less. Depending on the thickness of a specific disc, change rings 16 having a total thickness of the disc can be put onto a shoulder 17 of the cavity 14.

The clamping of the nickel disc 5 by means of the disc holder 7 takes place by gripping in the middle of said disc 5. The clamping is further assured by a ring-shaped groove 18, which is connected via conduits 19 and a ring-shaped cavity 20 with a suction conduit 21. The rear mould 3 displays a spiral-shaped conduit 22 for cooling fluid. Particular reference is now made to FIG. 2.

Figure 2:
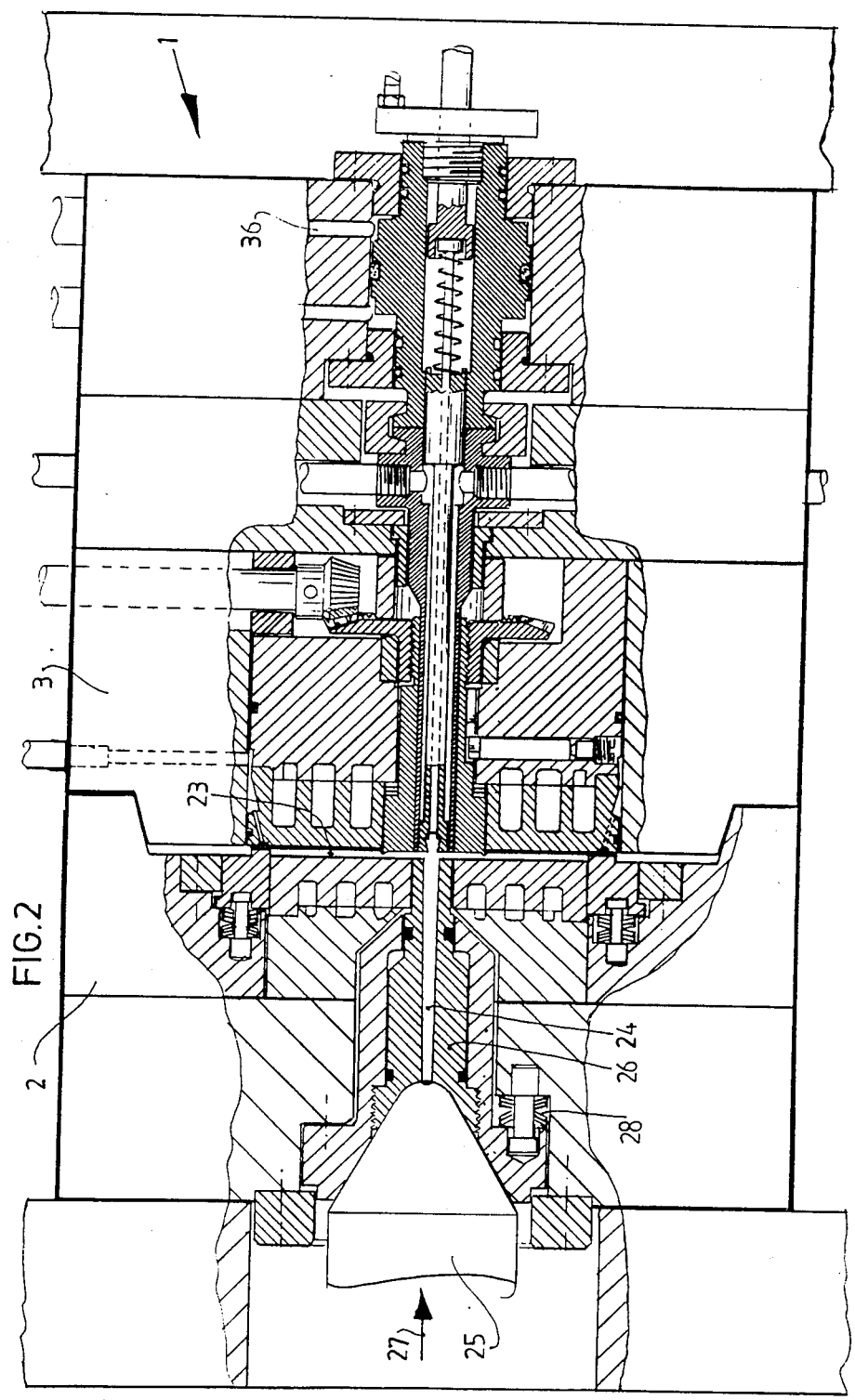

FIG. 2 shows the construction of the front mould 2, as well as the co-operation between same and the rear mould 3, which jointly bound a round disc-shaped form cavity 23. It will therefore also be apparent that FIG. 2 shows the closed position of the mould 1. Here the form cavity 23 is connected via a pressure conduit 24, diverging toward said cavity 23, with the injection nozzle 25 of an undrawn injection moulding unit. The arrow 27 shows the relative displacement of said injection nozzle 25 to arrive at is operating position.

The pressure conduit 24 extends through a movable central position 26 of the front mould 2.

Figure 3:
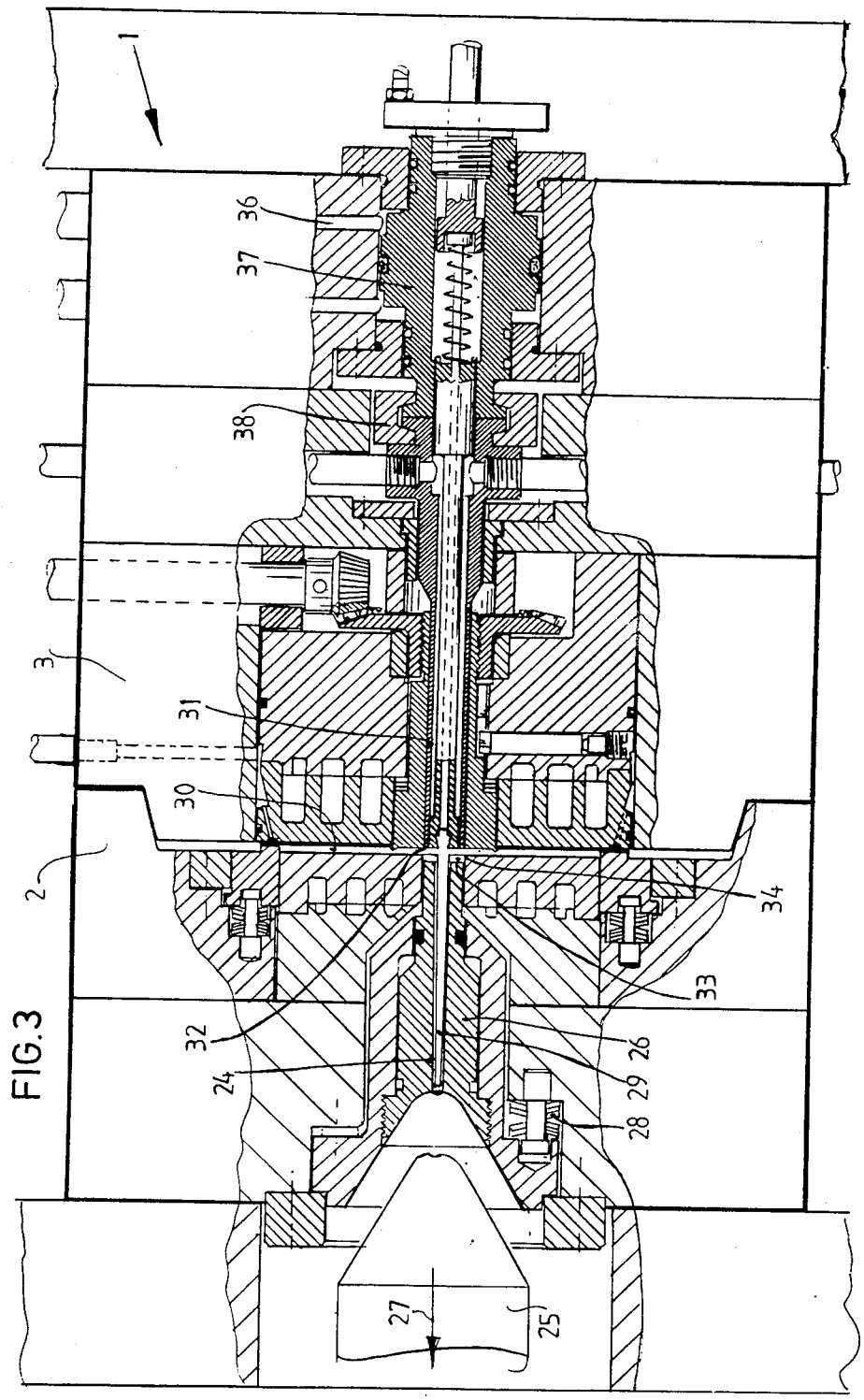
Figure 4:
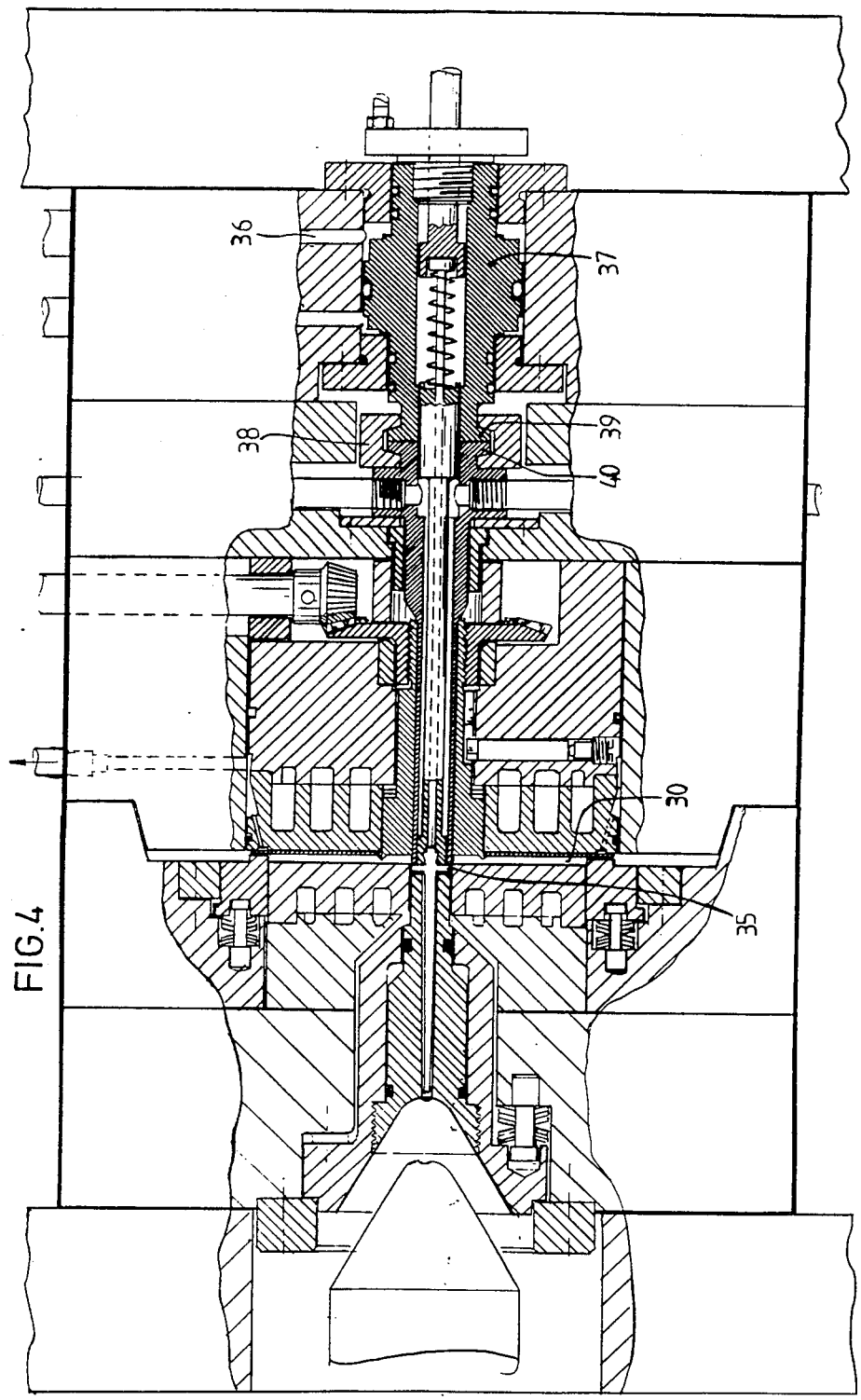

FIG. 3 shows how, by the backward displacement as according to the arrow 27 of the injection nozzle 25 through the operation of spring washers 28, the central position 26 is moved to the left, such that a sprue 29 of conical shape corresponding to that of the diverging pressure conduit 24 can release. Said sprue 29 of a shaped compact disc 30 can be detached from the latter by punching means, which serve to arrange a central hole in said compact disc 30. Said punching means are made in the form of a punching element 31, the diameter at the front edge 32 of which corresponds with that of the central cavity 33 in the front mould 2, in which the central portion 26 is movable. In this way the front edge 32 of the punching element 31 co-operates with the edge 34 of the cylindrical cavity 33 situated opposite to it to punch out a central part 35 from the compact disc 30 in the way shown in FIG. 4 and so form a central hole therein.

The forward movement of the punching element 31 is achieved by feeding fluid under pressure to a pressure conduit 36, whereby a piston 37 is displaced to the left. Said piston 37 is connected with the punching element 31 via a coupling ring 38 consisting of two halves.

It is remarked here that said divided coupling ring 38, which co-operates with two flanges 39, 40 of respectively the piston 37 and the punching element 31 having conical envelope shaped surfaces, possesses an interior form corresponding to the shape of said surfaces, such that by connecting bothhalves of said coupling ring 38 with undrawn means a very simple but nevertheless reliable coupling is obtained between said piston 37 and said punching element 31.

FIG. 5 shows that the central portion 35 and the conical sprue 29 which together form a whole are held in place on the front surface of the punching element 31. This is a result of the fact that an outwardly converging cavity 41 is present within said punching element 31 on its front surface, which, when the compact disc is formed, causes a part 42 to be formed in the centre of said disc and extending into said cavity 41, which part 42, because of the tapering form of said cavity 41, has a non-releasing connection with said punching element. The bottom of said cavity 41 is formed by the front surface of an ejector 43, which by displacing to the left as according to arrow 45 against the pressure from a spring 44 can apply a releasing force directed to the left on said part 42, whereby the waste material 29, 35, 42 is ejected.

The shaped compact disc 30 can now be removed by a manipulator 46 with suction pads 47, indicated schematically, and be conveyed for further treatment to the station concerned.

The suction conduit 21 is connected with a source of fluid under underpressure. Said source forms part of an undrawn injection moulding unit and is actuated by controlling means found therein, in any case during the phase shown in FIG. 5, i.e. during the disposal of the sprue and associated waste material and the removal of the formed product.

FIG. 6 shows that a disc holder 48, at variance with disc holder 7 according to the embodiment heretofore discussed, can be provided on its front surface with a cylindrical portion 49, whereby the desired central hole in the compact disc can be directly formed.

FIG. 7 shows the form of the securing flange of the disc holder 7, 48.

FIG. 8 shows a variant in which a central element 50, which is situated in the same position as the disc holder 48 as according to FIG. 6, is likewise provided on its front surface with the cylindrical portion 49 for forming a central hole in the compact disc 30. At variance with the previously discussed embodiment, however, said central element 50 is in this case not a disc holder in view of the fact that it is not provided on its front edge with the flange 10, as according to the foregoing figures and FIG. 7 in particular, but the nickel disc 7 is held in position solely by under-pressure. To this end not only is the ring-shaped groove 18 present in the circumferential zone of said nickel disc 5, but a second ring-shaped groove 52 is situated in the circumferential zone of the central hole of said disc, which groove is connected via conduit 53 and conduits 19 jointly with a source of fluid under underpressure.

FIG. 9 shows an embodiment which varies from that according to FIG. 8 in that, in the closed position of the mould, the edge 54 does not press onto the nickel disc 5 but onto the front surface 4. The ring-shaped groove 18 extends within the edge 54 to hold the nickel disc 5 in place. Such an embodiment can be advantageous for example for making numeric optical discs (NODs).

FIG. 10 shows a recess 55 in the front surface 4 of the rear mould 3, in which first a sinter bronze packing piece 56 is placed as according to arrow 57, whereafter a packing piece 59 is arranged as according to arrow 58, whereby the porous packing piece 56 is held in place. The suction conduit 19 connects onto said recess 55.

It will be apparent that, depending on the embodiment, it can be desirable or essential also to actuate the underpressure source in a phase other than the opened mould position.

Figure 11:
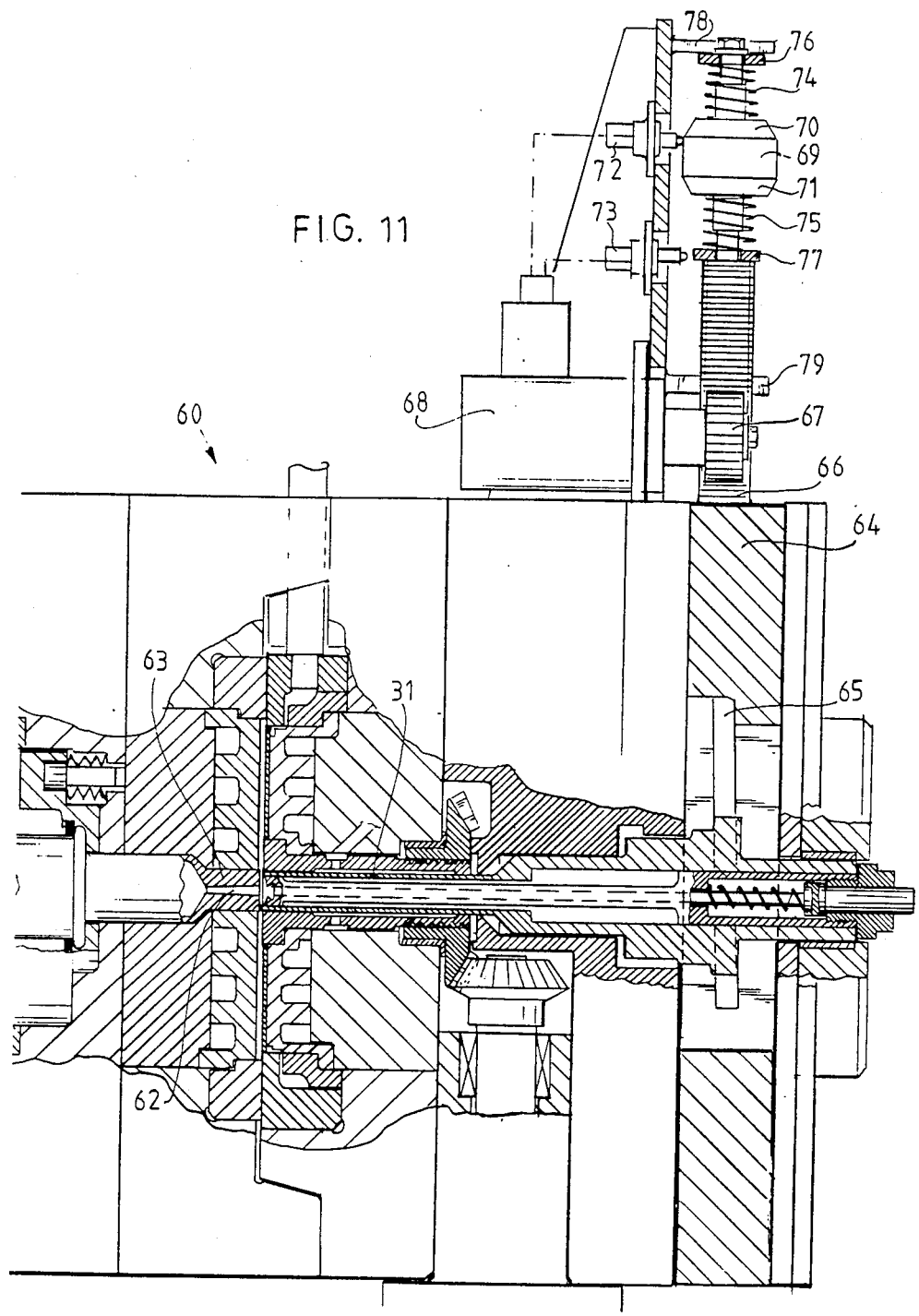
Figure 12:
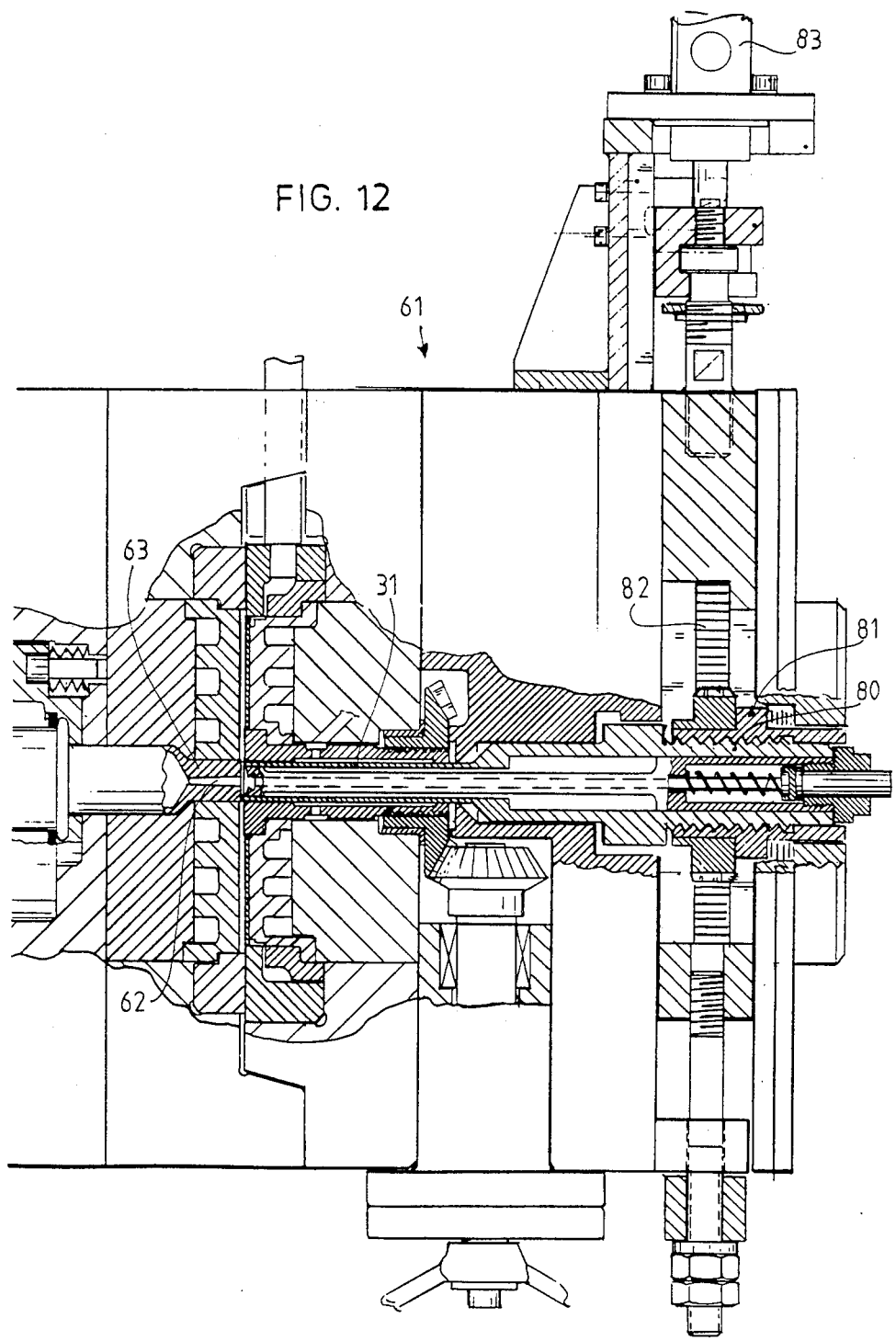

The FIGS. 11 and 12 show respectively injection moulds 60 and 61, the construction of which corresponds largely with that of the mould 1 heretofore described. Said moulds 60 and 61 differ from the mould 1 in the sense that they are constructed especially for hot injection. This will be apparent from the form of the diverging pressure conduit 62 in a central portion 63, analogous respectively to the diverging pressure conduit 24 and the central portion 26 of the injection mould 1. More important, however, is the presence of adjustment means for adjusting the distance of the front edge 32 of the punching element 31 from the edge 34 of the cavity 33, in which respect reference is made to FIG. 3.

Attention is drawn to the fact that, at variance with the description relating to the mould 1, moulds 60 and 61 offer the possibility of the punching element 31 being able to move, if required during the injection moulding process. In view of the fact that in these circumstances the central portion 63 has not yet been withdrawn during the entry of the punching element 31, there is no question here of a punching operation in the strict sense of the word. The front edge 32 of said punching element 31 moves with great facility through the not yet hardened plastic.

The mould 60 as according to FIG. 11 is provided with a sliding piece 64 which is coupled via a slightly inclined key way with an undrawn cam connected to the punching element 31. Said element 31 is secured against rotation by likewise undrawn means. This construction achieves that when the sliding piece 64 is moved up or downwards, said punching element 31 undergoes a corresponding axial displacement. In this way the position of same can be adjusted. A rack 66 is coupled to the sliding piece, said track being driven via a pinion 67 by a hydromotor. A cam 69 supported by the toothed rack 66 co-operates via rise surfaces 70, 71 with microswitches 72, 73, the positions of which determine the one extreme position and the other extreme position of the punching element 31. With respect to inertia effects, compression springs 74 and 75 are present which push rings 76, 77 away from the cam 69. Said rings 76, 77 co-operate with fixed impact buffers 78, 79 as smooth stops.

Not drawn in the embodiment in which use is made of an electric stepping motor instead of the hydromotor 68 with accessory adjustable control. In this respect attention is drawn to the fact that the use of a stepping motor dispenses with the relatively complicated control with cams and microswitches, and use can be made of digital counting means, having for example adjusting thumb wheels, to determine the stroke of the punching element.

FIG. 12 shows a variant where the punching element 31 is supported by an end 80 provided with screw thread which co-operates with a correspondingly rotating drivable part 81, which in turn can be driven rotatingly by a toothed rack 82. For driving said rack use is made in this case of a cylinder piston unit 83. It will be apparent that the threaded end 80 must be secured against rotation. These securing means are not reproduced in FIG. 12 for the sake of clarity in the drawing. They can for example consist of a key co-operating with a key-way in the known manner. A coating of titanium nitride may be appied to the wall of the cavity and/or at least on the surface of the insert piece directed toward the cavity:

I claim:

1. An injection molding apparatus for molding a disc having information impressed on at least one side thereof, which comprises first and second mold halves movable between a closed position defining a mold cavity therebetween and an open position allowing removal of a formed disc, means for injecting moldable material into the mold cavity when the mold halves are in closed position, each of the mold halves having a flat wall, the two flat walls being disposed in close proximity when the first and second mold halves are in closed position so as to define the mold cavity therebetween, insert means for impressing information on one side of a disc as it is formed, vacuum means for positioning and holding the insert means against the flat wall of the first mold half with sufficient force as to resist removal and displacement thereof by a formed disc when the mold halves are in open position and the formed disc is removed from the molding apparatus, and means for disabling the vacuum means to release the insert means and allow removal and replacement of the insert means when necessary.

2. An injection molding apparatus as defined in claim 1 wherein the vacuum means includes a first annular groove in the flat wall of said first mold half in facing relation to the insert means adjacent the periphery of the insert means.

3. An injection molding apparatus as defined in claim 2 wherein the vacuum means also includes a second annular groove in the flat wall of said first mold half concentric with the first annular groove, said second annular groove facing a central region of the insert means.

4. An injection molding apparatus for molding a compact disc having information impressed on at least one side thereof, which comprises first and second mold halves, said first mold half having a flat wall surface, insert means for impressing the audio information on one side of the compact disc as it is formed and having a central opening therein, pilot means upon which said central opening is positioned for piloting the insert means in concentric relation to the first mold half, vacuum means for positioning and holding the piloted insert means against said flat wall surface of the first mold half with sufficient force as to resist removal and displacement thereof during molding of a compact disc and subsequent removal of such molded compact disc from the molding apparatus, means for moving said mold halves between an open position in which a molded compact disc may be removed and a closed position defining a mold cavity bounded on one side by said insert means, means for injecting heated plastic material into the mold cavity when the mold halves are in the closed position, and means for disabling the vacuum means when the mold halves are in the open position to release the insert means and allow removal of the insert means after said compact disc has been molded for replacement by a different inserted means.

5. An injection molding apparatus as defined in claim 4 wherein the vacuum means includes a first annular groove in said flat wall of the first mold half, said first annular groove being in facing, contiguous relation to the insert means adjacent the periphery of the insert means.

6. An injection molding apparatus as defined in claim 5 wherein the vacuum means also includes a second annular groove in said flat wall concentric with the first annular groove, said second annular groove being in facing, contiguous relation to a central region of the insert means.

7. In an injection molding apparatus which comprises the combination of a pair of mold halves movable between an open position in which molded material may be removed and a closed position defining a disc-like mold cavity, means for moving the mold halves between the open and the closed positions, means for injecting plastic material into the mold cavity, and removable annular insert means carried by one of the mold halves for impressing information on one side of the molded material as it is formed, the improvement comprising:

vacuum means for holding the insert means in contiguous relation against said one of the mold halves with sufficient force as to prevent separation of the insert means from the one mold half when the mold halves are in open position, and means for selectively controlling said vacuum means to release the insert means from its position forced against the one mold half to allow separation of the insert means from said one of the mold halves.

8. In an injection molding apparatus as defined in claim 7 wherein the vacuum means constitutes the sole means which forces the insert means against the one mold half when the mold halves are in the open position.

9. In an injection molding apparatus as defined in claim 7 including pilot means removably carried by the one mold half and projecting partially into a central portion of the mold cavity for forcibly holding a central portion of the annular insert means against the one mold half so as to assist the vacuum means.

10. In an injection molding apparatus as defined in claim 9 wherein the mold halves sandwich the periphery of the insert means therebetween when the mold halves are in the closed position.

11. In an injection molding apparatus as defined in claim 10 wherein the vacuum means includes orifices in the one mold half in opposed relation to a peripheral margin of the insert means.

12. In an injection molding apparatus as defined in claim 7 wherein the vacuum means includes orifices in the one mold half in opposed relation to a peripheral margin of the insert means.

13. In an injection molding apparatus as defined in claim 12 including pilot means carried by the one mold half and projecting through the opening defined by the annular insert means partially into a central portion of the mold cavity for locating the central portion of the insert means within the mold cavity.

14. In an injection molding apparatus as defined in claim 13 wherein the pilot means is hollow, the means for injecting feeds into the mold cavity centrally though the other of the mold halves and including punching means axially slidable in the hollow pilot means for punching a hole through the center of the molded material to form the molded material into an annular disc from which the material forming the hole and any sprue attached thereto has been removed.

15. In an injection molding apparatus as defined in claim 7 wherein the vacuum means includes porous material in the one mold half in opposed relation to a peripheral margin of the insert means and a source of vacuum communicating with the peripheral margin of the insert means through the porous material.

16. In an injection molding apparatus as defined in claim 15 wherein the porous material is a sintered material.

* * * * *